US010728943B2

(12) United States Patent
Jang et al.

(10) Patent No.: US 10,728,943 B2
(45) Date of Patent: Jul. 28, 2020

(54) APPARATUS AND METHOD FOR CONTROLLING SCELLS IN WIRELESS COMMUNICATION SYSTEM

(71) Applicant: Samsung Electronics Co., Ltd, Gyeonggi-do (KR)

(72) Inventors: Jaehyuk Jang, Gyeonggi-do (KR); Sangbum Kim, Gyeonggi-do (KR); Soenghun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 15/225,734

(22) Filed: Aug. 1, 2016

(65) Prior Publication Data
US 2017/0367139 A1    Dec. 21, 2017

(30) Foreign Application Priority Data

Jul. 31, 2015  (KR) .......................... 10-2015-0109110

(51) Int. Cl.
*H04W 76/15*   (2018.01)
*H04W 52/02*   (2009.01)
(Continued)

(52) U.S. Cl.
CPC .......... *H04W 76/15* (2018.02); *H04W 16/14* (2013.01); *H04W 52/0206* (2013.01);
(Continued)

(58) Field of Classification Search
CPC ... H04W 76/025; H04W 16/14; H04W 76/15; H04W 52/0206; H04W 84/042; H04W 84/12
See application file for complete search history.

(56) References Cited

U.S. PATENT DOCUMENTS

| 2002/0019236 A1* | 2/2002 | Thompson | .......... H04L 43/0876 |
| | | | 455/452.2 |
| 2003/0096631 A1* | 5/2003 | Kayama | ................ H04W 52/50 |
| | | | 455/522 |

(Continued)

FOREIGN PATENT DOCUMENTS

| WO | 2014052877 A1 | 4/2014 |
| WO | 2015065029 A1 | 5/2015 |

OTHER PUBLICATIONS

International Search Report dated Oct. 28, 2016 in connection with International Application No. PCT/KR2016/008471, 9 pages.

(Continued)

*Primary Examiner* — Jenee Holland (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for utilizing an unlicensed frequency band as a supplementary band is used in a Long Term Evolution (LTE) system. A secondary component carrier management method of a base station according to the present disclosure includes configuring a secondary component carrier of a second band to a terminal connected to the base station in a first band, determining whether a packet is present over a bearer allowing transmission on the secondary component carrier, and deactivating/releasing the secondary component carrier when no packet is present over the carrier.

12 Claims, 8 Drawing Sheets

(51) Int. Cl.
H04W 16/14 (2009.01)
H04W 84/12 (2009.01)
H04W 84/04 (2009.01)

(52) U.S. Cl.
CPC .......... *H04W 84/042* (2013.01); *H04W 84/12* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/21* (2018.01); *Y02D 70/23* (2018.01)

(56) References Cited

U.S. PATENT DOCUMENTS

| | | | | |
|---|---|---|---|---|
| 2003/0125037 | A1* | 7/2003 | Bae | H04W 28/22 455/450 |
| 2005/0090262 | A1* | 4/2005 | Hamano | H04W 36/0011 455/445 |
| 2005/0101329 | A1* | 5/2005 | Gallagher | H04W 16/16 455/436 |
| 2006/0171422 | A1* | 8/2006 | Xue | H04W 76/025 370/521 |
| 2006/0223538 | A1* | 10/2006 | Haseba | H04W 36/18 455/436 |
| 2008/0014959 | A1* | 1/2008 | Karlsson | H04W 76/068 455/455 |
| 2009/0086671 | A1* | 4/2009 | Pelletier | H04W 72/12 370/329 |
| 2010/0081444 | A1* | 4/2010 | Jin | H04W 76/062 455/450 |
| 2010/0142457 | A1* | 6/2010 | Chun | H04W 72/1284 370/329 |
| 2011/0134774 | A1* | 6/2011 | Pelletier | H04W 52/365 370/252 |
| 2011/0199951 | A1* | 8/2011 | Kwon | H04W 52/0212 370/311 |
| 2011/0243106 | A1* | 10/2011 | Hsu | H04L 5/0096 370/336 |
| 2012/0082107 | A1* | 4/2012 | Ou | H04W 74/0833 370/329 |
| 2012/0281548 | A1* | 11/2012 | Lin | H04W 36/30 370/242 |
| 2012/0294213 | A1* | 11/2012 | Chen | H04L 5/001 370/311 |
| 2013/0028198 | A1* | 1/2013 | Yamada | H04W 56/0005 370/329 |
| 2013/0237208 | A1* | 9/2013 | Vujcic | H04B 7/15507 455/418 |
| 2013/0272279 | A1 | 10/2013 | Dinan | |
| 2013/0322371 | A1* | 12/2013 | Prakash | H04W 72/04 370/329 |
| 2013/0343261 | A1* | 12/2013 | Gonsa | H04B 7/2606 370/315 |
| 2014/0044055 | A1* | 2/2014 | Caverni | H04W 28/16 370/329 |
| 2014/0087748 | A1 | 3/2014 | Hong et al. | |
| 2015/0049739 | A1* | 2/2015 | Lee | H04W 56/0045 370/336 |
| 2015/0063151 | A1 | 3/2015 | Sadek et al. | |
| 2015/0085683 | A1 | 3/2015 | Sadek et al. | |
| 2015/0085684 | A1 | 3/2015 | Sadek | |
| 2015/0110011 | A1* | 4/2015 | Wei | H04L 5/0098 370/329 |
| 2015/0163801 | A1 | 6/2015 | Sadek | |
| 2015/0365897 | A1* | 12/2015 | Hu | H04W 52/0225 455/574 |
| 2016/0073404 | A1* | 3/2016 | Vutukuri | H04W 72/042 370/329 |
| 2016/0100345 | A1* | 4/2016 | Thangarasa | H04L 5/00 370/332 |
| 2016/0100449 | A1 | 4/2016 | Jang et al. | |
| 2016/0157265 | A1* | 6/2016 | Lee | H04W 72/1284 370/329 |
| 2016/0219475 | A1* | 7/2016 | Kim | H04W 76/025 |
| 2016/0227602 | A1 | 8/2016 | Yi et al. | |
| 2016/0270107 | A1* | 9/2016 | Dinan | H04J 11/00 |
| 2016/0302076 | A1* | 10/2016 | Chou | H04W 16/14 |
| 2016/0360422 | A1* | 12/2016 | Zhang | H04W 16/14 |

OTHER PUBLICATIONS

Institute of Electrical and Electronics Engineers (IEEE) 802.11, "Part 11: Wireless LAN Medium Access Control (MAC) and Physical Layer (PHY) Specifications, IEEE Standard for Information Technology, Telecommunications and Information Exchange Between Systems, Local and Metropolitan Area Networks, Specific Requirements", pp. 1011-1023, Mar. 29, 2012.

Communication from a foreign patent office in a counterpart foreign application, European Patent Office, "Supplementary European Search Report," Application No. 16833314.4, dated Jul. 17, 2018, 8 pages.

\* cited by examiner

APPARATUS AND METHOD FOR CONTROLLING SCELLS IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed on Jul. 31, 2015 in the Korean intellectual property office and assigned serial number 10-2015-0109110, the entire disclosure of which is hereby incorporated by reference.

TECHNICAL FIELD

The present disclosure relates to a wireless communication system and, in particular, to a technology for utilizing an unlicensed frequency band as a supplementary band in a Long Term Evolution (LTE) system. This technology may include a Licensed Assisted Access technology for utilizing the unlicensed frequency band with the assistance of a base station operating in a licensed frequency band and a LTE-WLAN integration or aggregation technology for utilizing Wireless Local Area Network (WLAN) in the unlicensed frequency band.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the rapid advance of wireless communication technology, communication systems have evolved to the $4^{th}$ Generation mobile communication systems represented by the LTE system. The LTE system employs several key technologies to meet the demand of increasing traffic, and Carrier Aggregation (CA) is one of such technologies. CA is a technique for use of one or more component carriers in addition to a primary component carrier to increase the data rate between a terminal (hereinafter, referred to as User Equipment or UE) and a base station (hereinafter, referred to as evolved Node B or eNB) in proportion to the number of component carriers, which is unlike the legacy communication system that uses one component carrier.

In LTE, the primary and secondary component carriers are referred to as Primary Cell (PCell) and Secondary Cell (SCell), respectively. The LTE (Release 11) supports one PCell plus up to four SCells, and the number of supportable SCells may increase in the future.

Although the LTE system is designed to operate in a frequency band that the government licenses to a mobile operator, many technical studies on the use of unlicensed bands already populated by devices operating on other technologies such as WLAN and Bluetooth are being conducted to meet the increasing traffic demand, and Licensed Assisted Access (LAA) is a promising technology enabling LTE to operate in unlicensed bands.

Independent of the LAA technology, a technology called LTE-WLAN (carrier) aggregation or integration is under discussion for simultaneous use of both the licensed LTE band and unlicensed WLAN band.

In the case of using the CA technique along with the LAA technology, it may be possible to consider a scenario where the PCell operates on a licensed band frequency while the SCell operates on an unlicensed band frequency with the LAA technology. In the case of using the CA technique along with the LTE-WLAN integration technology, it may be possible to consider a scenario where the PCell operates on a licensed band frequency while the SCell operates on an unlicensed band frequency with the WLAN technology.

Both the cases have a drawback in that using an unlicensed band as a supplementary band increases power consumption of the UE.

SUMMARY

To address the above-discussed deficiencies, it is a primary object of this disclosure to provide an apparatus and method for deactivating or releasing the unlicensed frequency band SCell that an eNB has configured to a UE in a wireless mobile communication system based on the LAA technology.

In the present disclosure, an eNB checks the buffer states for the bearer(s) allowing transmission in the unlicensed frequency band and runs an idle timer to monitor packet transmission over the corresponding bearer(s). If the buffer is empty or the timer expires, the eNB may deactivate or release the corresponding unlicensed band cell (LAA cell or WLAN cell) to reduce unnecessary power consumption of the UE.

In accordance with an aspect of the present disclosure, a secondary component carrier management method of a base station is provided. The method includes configuring a secondary component carrier of a second band to a terminal connected to the base station in a first band, determining whether a packet is present on a bearer allowing transmission on the secondary component carrier, and deactivating/releasing, when no packet is present on the carrier, the secondary component carrier.

In accordance with another aspect of the present disclosure, a secondary component carrier management method of a terminal is provided. The method includes receiving a message for configuring a secondary component carrier in a second band from a base station to which the terminal connects in a first band and receiving, when no packet is present on a bearer allowing transmission on the secondary carrier component, a message for deactivating the secondary component carrier.

In accordance with another aspect of the present disclosure, a base station is provided. The base station includes a transceiver for transmitting and receiving signals and a controller which configures a secondary component carrier of a second band to a terminal connected to the base station in a first band, determines whether a packet is present on a bearer allowing transmission on the secondary component carrier, and controls deactivating/releasing, when no packet is present on the carrier, the secondary component carrier.

In accordance with still another aspect of the present disclosure, a terminal is provided. The terminal includes a transceiver for transmitting and receiving signals and a controller which controls the transceiver to receive a message for configuring a secondary component carrier in a second band from a base station to which the terminal connects in a first band and to receive, when no packet is present on a bearer allowing transmission on the secondary carrier component, a message for deactivating the secondary component carrier.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Embodiments of the present disclosure are described with reference to the accompanying drawings in detail. Detailed descriptions of well-known functions and structures incorporated herein may be omitted to avoid obscuring the subject matter of the present disclosure. Further, the following terms are defined in consideration of the functionality in the present disclosure, and they may vary according to the intention of a user or an operator, usage, etc. Therefore, the definition should be made on the basis of the overall content of the present specification.

The present disclosure is directed to a multiple connectivity technology for use in a wireless communication system.

In the following description, the terms used for identifying access nodes, network entities, messages, inter-network entity interfaces, and information items are selected just for convenience of explanation. Accordingly, the terms used in the following description are not limited to specific meanings, and they may be replaced by other terms having similar technical meanings.

In the following description, the terms and definitions given in the $3^{rd}$ Generation Partnership Project (3GPP) LTE standard are used for convenience of explanation. However, the present disclosure is not limited by the terms and names used herein, and it may be applied to the communication systems following other standards.

Figure 1:
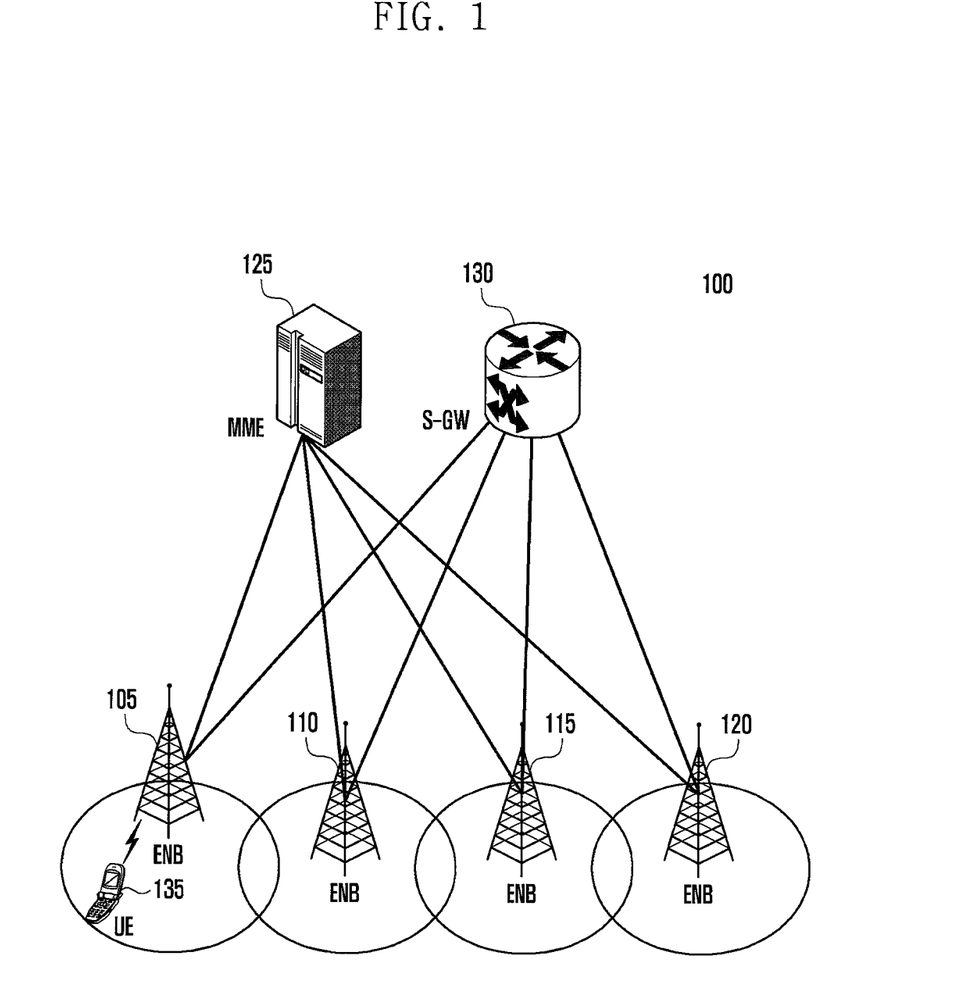
FIG. 1 illustrates an LTE system architecture to which the present disclosure is applied.

FIG. 1 illustrates LTE system architecture to which embodiments of the present disclosure are applied.

With reference to FIG. 1, the Radio Access Network 100 of the LTE system includes evolved Node Bs (eNBs) 105, 110, 115, and 120; a Mobility Management Entity (MME) 125, and a Serving Gateway (S-GW) 130. The User Equipment (UE) 135 connects to an external network via the eNBs 105, 110, 115, and 120 and the S-GW 130.

The eNBs 105, 110, 115, and 120 are equivalent to the legacy node Bs of the universal mobile telecommunications system (UMTS). The UE 135 connects to one of the eNBs via a radio channel, and the eNB has more control functions than the legacy node B. In the LTE system, all user traffic including real time services such as Voice over IP (VoIP) are served through a shared channel; thus, there is a need of an entity capable of collecting per-UE state information (such as buffer status, allowed transmission power state, and channel status) and scheduling the UEs based on the state information; the eNBs 105, 110, 115, and 120 are responsible for these functions. Typically, one eNB has multiple cells.

The LTE system adopts Orthogonal Frequency Division Multiplexing (OFDM) as a radio access technology in order to secure a high data rate of up to 100 Mbps. The LTE system also adopts Adaptive Modulation and Coding (AMC) to determine the modulation scheme and channel coding rate in adaptation to the channel condition of the UE.

The S-GW 130 is an entity that provides data bearers to establish and release data bearers under the control of the MME 125.

The MME 125 performs various control functions and maintains connections with a plurality of eNBs.

Figure 2:
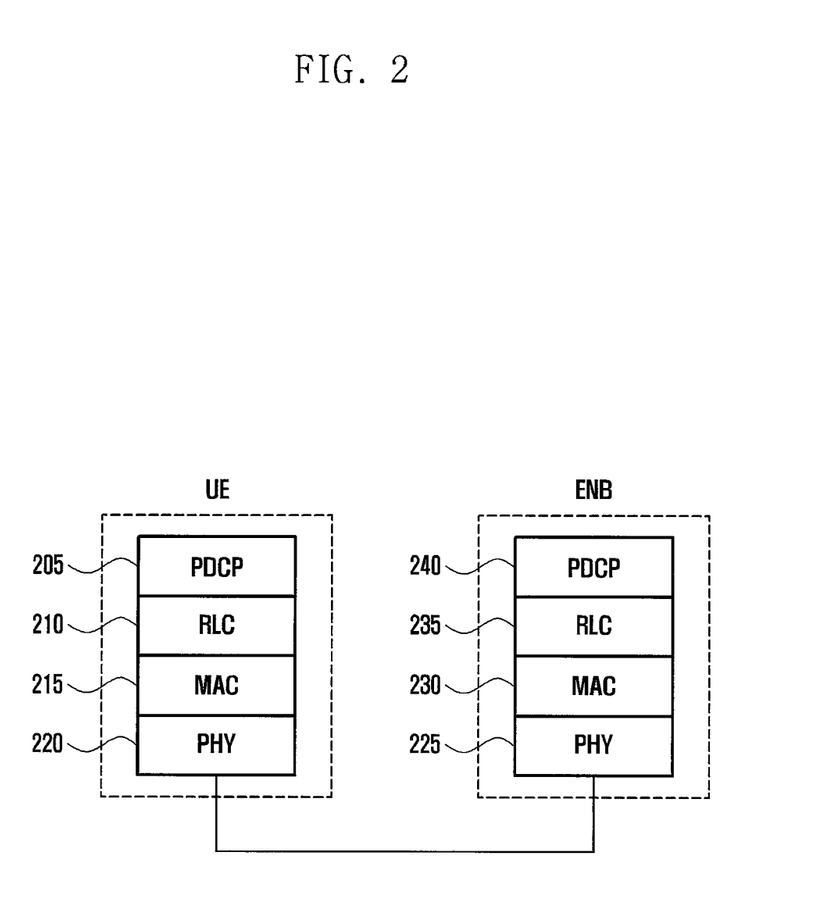
FIG. 2 illustrates a protocol stack of an interface between a UE and an eNB in the LTE system to which the present disclosure is applied.

FIG. 2 illustrates a protocol stack of an interface between a UE and an eNB in the LTE system to which the present disclosure is applied.

As shown in FIG. 2, the protocol stack of the interface between the UE and the eNB in the LTE system includes a plurality of protocol layers stacked from the bottom to the top: physical layer denoted by reference numbers 220 and 225, medium access control (MAC) layer denoted by reference numbers 215 and 230, radio link control (RLC) layer denoted by reference numbers 210 and 235, and packet data convergence control (PDCP) layer denoted by reference numbers 205 and 240.

The PDCP layer denoted by reference numbers 205 and 240 performs compressing/decompressing of an IP header.

The RLC layer denoted by reference numbers 210 and 235 performs segmenting of a PDCP Packet Data Unit (PDU) into segments of appropriate size.

The MAC layer denoted by reference number 215 and 230 allows for connection of multiple RLC entities and performs multiplexing RLC PDUs from the RLC layer into a MAC PDU and demultiplexing a MAC PDU into RLC PDUs.

The PHY layer denoted by reference numbers 220 and 225 performs channel-coding and modulation on higher layer data to generate and transmit OFDM symbols over a radio channel and demodulating and channel-decoding on OFDM symbols received over the radio channel to deliver the decoded data to the higher layers. The PHY layer denoted by reference numbers 220 and 225 uses Hybrid Automatic Repeat Request (HARQ) for additional error correction by transmitting 1-bit information indicating positive or negative acknowledgement about data packet, the acknowledgement being transmitted from the receiver to the transmitter. The 1-bit information is referred to as acknowledgement/negative acknowledgement (ACK/NACK).

The downlink HARQ ACK/NACK corresponding to an uplink transmission may be transmitted in Physical Hybrid-ARQ Indicator Channel (PHICH), and the uplink HARQ ACK/NACK corresponding to a downlink transmission may be transmitted in a Physical Uplink Control Channel (PUCCH) or Physical Uplink Shared Channel (PUSCH).

In the LTE system, the PHY layer operates in 10 milliseconds (ms) radio frames, and there are two types of radio frame structures.

Type 1: used for Frequency Division Duplex (FDD) mode
Type 2: used for Time Division Duplex (TDD) mode Both of the two types of radio frames have a length of 10 ms, and one radio frame is divided into 10 subframes of 1 ms each. That is, one radio frame consists of 10 subframes indexed 0 to 9.

In the FDD mode, the uplink and downlink are separated in the frequency domain, and each of the uplink and downlink radio frames consists of 10 subframes.

In the TDD mode, one radio frame consists of 10 subframes including at least one downlink subframe, at least one uplink subframe, and at least one special subframe, the special subframe consisting of a Downlink Pilot Time Slot (DwPTS), a Guard Period (GP), and an Uplink Pilot Time Slot (UpPTS) as a switching point between downlink and uplink transmission. The lengths of DwPTS, GP, and UpPTS are configurable, and the total length of the DwPTS, GP, and UpPTS is equal to 1 ms.

Figure 3:
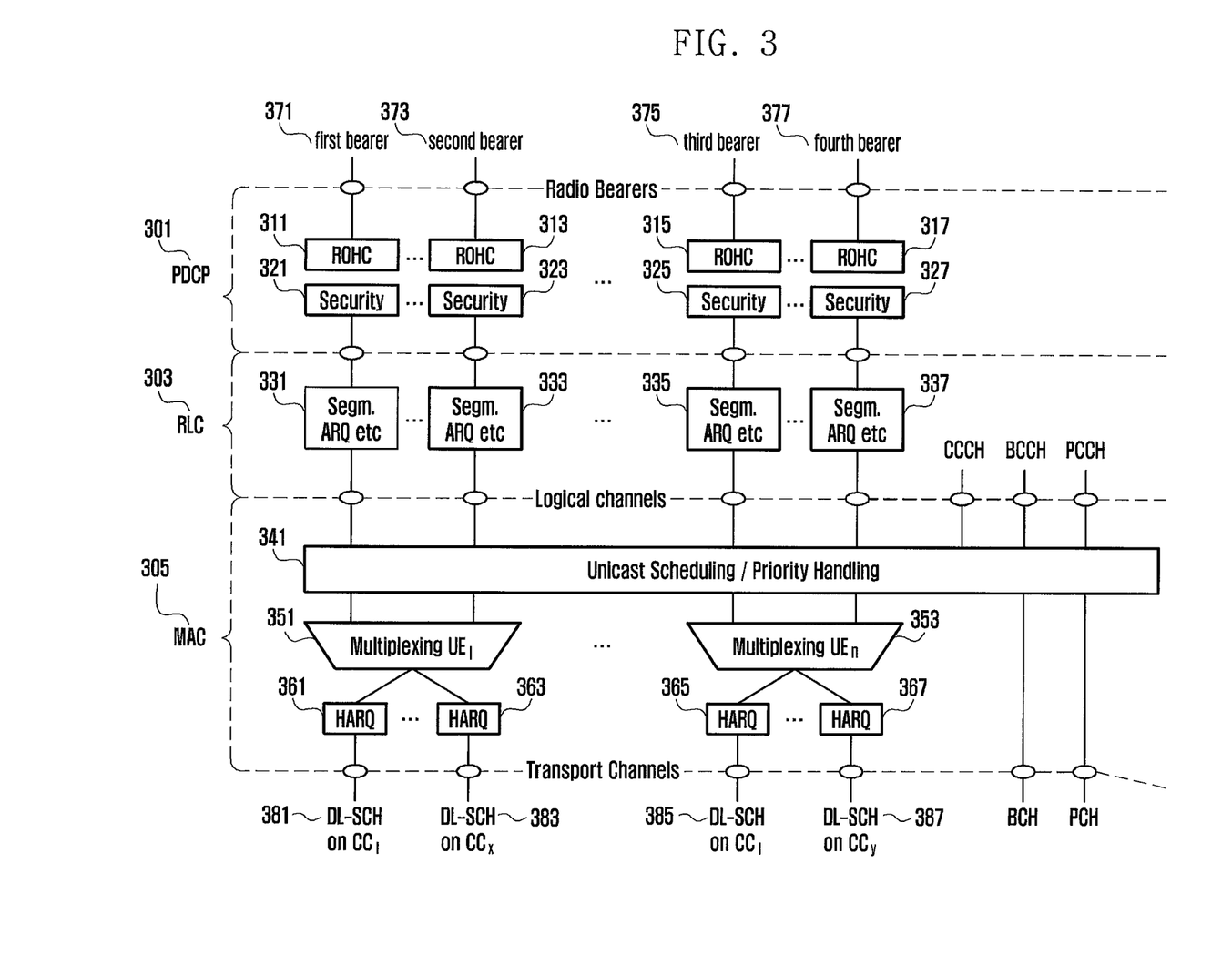
FIG. 3 illustrates a layer 2 (L2) protocol structure of an eNB of the LTE system to which the present disclosure is applied.

FIG. 3 illustrates a layer 2 (L2) protocol structure of an eNB of the LTE system to which the present disclosure is applied.

As described with reference to FIG. 2, the L2 protocol structure consists of a PDCP layer 301, an RLC layer 303, and a MAC layer 305.

The PDCP layer 301 performs IP header compression/decompression as denoted by reference numbers 311, 313, 315, and 317 and packet security as denoted by reference numbers 321, 323, 325, and 327.

The RLC layer 303 performs concatenation and/or segmentation of PDCP PDUs into suitably sized RLC PDUs and automatic repeat request (ARQ) of packets in consideration of the characteristics of a configured bearer as denoted by reference numbers 331, 333, 335, and 337.

The MAC layer 305 performs making a scheduling decision to determine which resources to use to transmit which packet of which user in priority as denoted by reference number 341, multiplexing the RLC PDUs into MAC PDUs as denoted by reference numbers 351 and 353, and performing cell-specific HARQ (e.g., licensed band cell and unlicensed band cell) as denoted by reference numbers 361, 363, 365, and 367 for data transmission as denoted by reference numbers 381, 383, 385, and 387.

A UE connected to an eNB may have multiple bearers. A radio bearer is a logical path for transmitting data packets meeting similar QoS requirements, and FIG. 3 shows an example of a situation in which UE1 has the first and second bearers 371 and 373 and UEn has the third and fourth bearers 375 and 377.

The bearers may have different PDCP and RLC characteristics. For example, the PDCP layer 301 may perform IP header compression/decompression (denoted by reference numbers 311, 313, 315, and 317) depending on the bearer.

The RLC layer 303 may or may not perform segmentation of PDCP PDU into suitably sized data units and/or ARQ for the packets (denoted by reference numbers 331, 333, 335, and 337) depending on the bearer. The bearer on which the PDCP PDU is transmitted without being segmented on the RLC layer is referred to as an RLC Transparent Mode (RLC-TM) bearer, while the bearer on which the PDCP PDU is transmitted after being segmented if necessary and guaranteed by ARQ for increasing transmission probability through RLC retransmission is referred to as RLC Acknowledged Mode (RLC-AM) bearer.

The bearers may be classified into two categories based on the types of the packets transmitted thereover: Signaling Radio Bearer (SRB) and Data Radio Bearer (DRB).

The SRB is used when the eNB transmits control messages to the UE, and the control messages include the messages generated at a Radio Resource Control (RRC) layer residing above the PDCP layer. The control messages may include the messages for accepting access of the UE to the eNB, setting parameters for communication between the eNB and the UE, and commanding handover to another cell/eNB.

The DRB is used for normal user data transmission. Accordingly, the DRB may be classified into one of an RLC-AM bearer or an RLC-UM bearer depending on the transmission data characteristics. For example, in the case of a voice service such as Voice over IP (VoIP), it is preferable to use the RLC-UM bearer without ARQ because the voice packets are delay-sensitive; in the case of a web-browsing service, it is preferable to use the RLC-AM bearer because reliability is more important than delay for web-browsing.

Accordingly, the present disclosure is directed to a scenario in which specific bearers are allowed for the unlicensed band cell (or unlicensed band secondary carrier component) among the aforementioned bearers.

Because the information transmitted on the SRB affects the UE operation significantly, it is preferable to transmit such control information through a secure licensed band channel.

In the case of a DRB service such as web-browsing, even though there is data loss, the lost data can be recovered by a higher layer protocol such as Transmission Control Protocol (TCP), and such a processing delay may be tolerable.

Accordingly, the present disclosure is directed to a scenario in which specific bearers are allowed for an unlicensed band cell (i.e., LAA cell or LTE-WLAN integration cell) among the aforementioned bearers.

Figure 4:
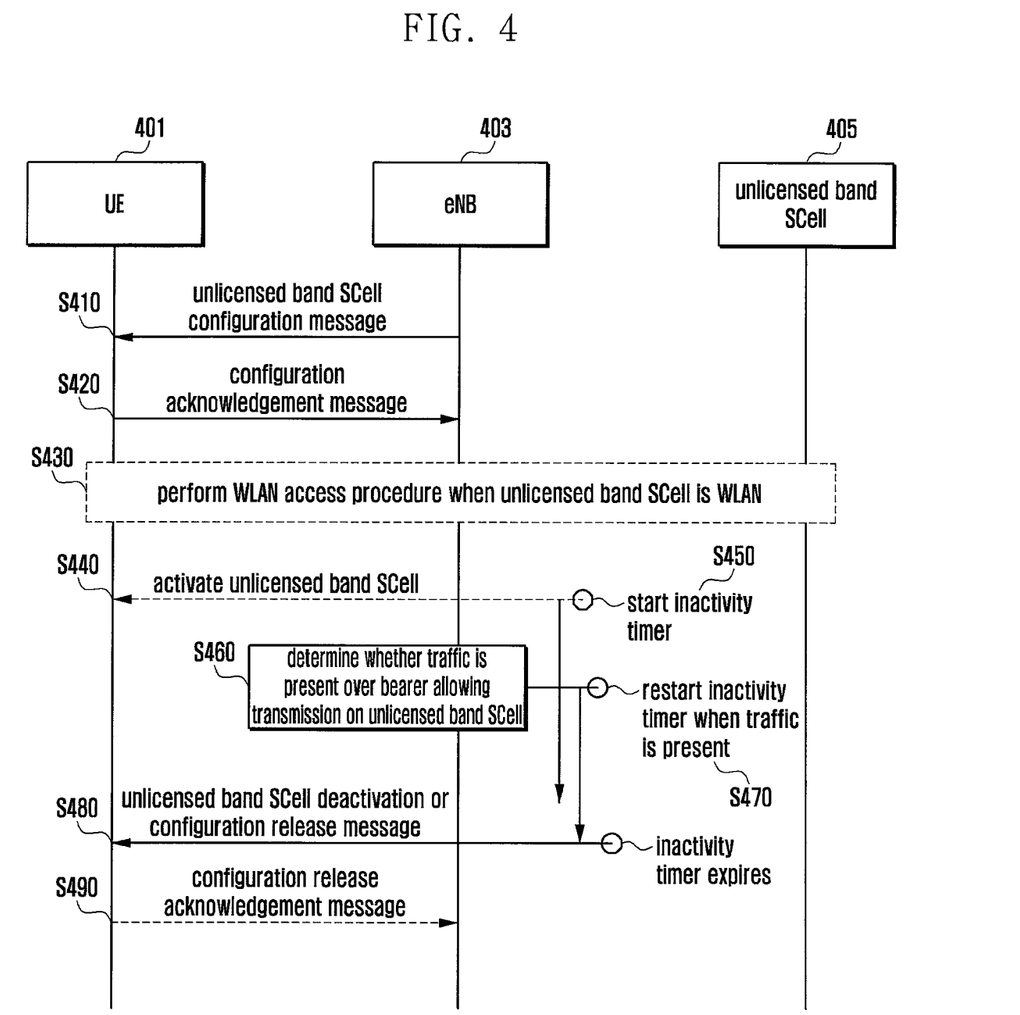
FIG. 4 illustrates message flows between a UE and an eNB according to an embodiment of the present disclosure.

FIG. 4 illustrates message flows between a UE and an eNB according to an embodiment of the present disclosure.

The eNB 403 operating in the first band may configure a cell 405 (or secondary component carrier) to the UE 401 connected thereto, at step S410. In an embodiment of the present disclosure, the eNB 403 may transmit, to the UE 401, a message for configuring the cell 405 (or secondary component carrier) using (operating in) the second band. In an embodiment of the present disclosure, the first band may denote a licensed band, and the second band may denote an unlicensed band. In the following descriptions, the term "first band" is used interchangeably with the term "licensed band", and the term "second band" is used interchangeably with the term "unlicensed band". Also, the cell 405 (or secondary component carrier) operating in the second band is interchangeably referred to as a second band cell or an unlicensed-band SCell.

However, the first and second bands are not limited to the above description. That is, the first band may be an unlicensed band (or licensed band), and second band may be a licensed band (or unlicensed band).

The unlicensed band cell 405 may be an LAA cell operating in the unlicensed band or a WLAN cell operating in the unlicensed band on the basis of the LTE-WLAN integration technology.

If the configuration message is received, the UE 401 may acquire the information on the unlicensed band cell to be added from the configuration message. The cell information may include at least one of cell identifier and operation frequency of the corresponding cell. The cell information may also include a bearer identifier indicating the bearer(s) available for use in the corresponding cell. The configuration message may be an RRC message (e.g., RRCConnectionReconfiguration message). The UE may acquire the cell information and bearer information from a cell information field and a bearer information field (e.g., DRB-ToAddMod and SRB-ToAddMod).

If the configuration message is received, the UE 401 may transmit the eNB 403 an acknowledgement message for acknowledging successful receipt of the configuration information included in the configuration message, at step S420. The acknowledgement message may be an RRC message (e.g., RRCConnectionReconfigurationComplete message).

If the unlicensed band cell 405 is a WLAN cell, the UE 401 may perform, at step S430, a procedure for access to the WLAN configured based on the configuration message. The WLAN access procedure may comprise of an authentication process and an association process as specified in the Institute of Electrical and Electronics Engineers (IEEE) 802.11 standard.

The unlicensed cell 405 configured at step S410 may be activated immediately upon being configured or may remain in an inactivated state after being configured. In the case that the configured cell 405 is maintained in the inactivated state, the eNB 403 may transmit to the UE 401 an activation command message to activate the unlicensed-band SCell 405, at step S440. The activation command message may be an Activation/Deactivation MAC Control Element (A/D MAC CE) message or an RRC message.

Next, the eNB 403 may start an inactivity timer, at step S450. In detail, the eNB 403 may start the inactivity timer for use in determining whether packet transmission is present on at least one bearer at the time when the unlicensed-band SCell 405 is activated.

After starting the inactivity timer, the eNB 403 may monitor, at step S460, the bearers allowing transmission on the activated unlicensed-band SCell 405 to detect the presence of traffic while the timer is running.

Here, the bearer is a logical path for transmitting data packets meeting similar QoS requirements, and the bearers allowing transmission on the unlicensed-band SCell 405 may denote bearers meeting the QoS requirements even when using the unlicensed band.

For example, a bearer with high QoS requirements for control signaling and VoLTE service may not allow transmission on the unlicensed band SCell 405. In contrast, a bearer with low QoS requirements for web-browsing may allow transmission on the unlicensed-band SCell 405.

In an embodiment of the present disclosure, it may be possible to determine a bearer allowing transmission on the unlicensed-band SCell 405 depending on the type of the bearer and check the presence of data transmission on the bearer allowing transmission on the unlicensed-band SCell.

If an unlicensed band WLAN cell is configured, the eNB may configure a specific bearer as an LTE-WLAN Aggregation (LWA) bearer to allow transmission in the unlicensed band.

The eNB 403 may restart the timer at step S470, when traffic is present on the corresponding bearer. The eNB 403 may restart the timer when there is a plurality of bearers allowing transmission on the unlicensed SCell 405 and traffic is present on one of the bearers. Also, the eNB 403 may restart the timer when the total traffic amount present on the bearer is equal to or greater than a predetermined threshold.

If no traffic is present on the bearer allowing transmission in the unlicensed band before expiry of the timer, the eNB 403 may release or deactivate the corresponding unlicensed-band SCell 405, at step S480. That is, if there is no traffic on the bearer allowing transmission on the unlicensed-band SCell until the expiry of the timer, the eNB 403 may transmit a deactivation command to deactivate the corresponding unlicensed-band SCell 405 or a message for releasing the unlicensed-band SCell configuration.

The eNB 403 may also deactivate or release the unlicensed-band SCell regardless of the signal strength in the corresponding unlicensed-band. The eNB 403 may also deactivate or release the unlicensed-band SCell 405 when the signal strength in the corresponding unlicensed band is equal to or greater than a predetermined threshold. However, the UE 401 may use a channel established already in the licensed band or unlicensed band, and the eNB 403 may communicate with the UE 401 through the channel to reduce power consumption of the UE 401.

The deactivation command message may be an A/D MAC CE message or a newly defined RRC message, and the configuration release message may be an RRC message such as an RRCConnectionReconfiguration message.

If the deactivation command message or configuration release message is received, the UE 401 may transmit, to the eNB 403, an acknowledgement message for acknowledging successful receipt of the deactivation command or configuration release information at step S490. The acknowledgement message may be an RRC message such as an RRCConnectionReconfigurationComplete message.

Figure 5:
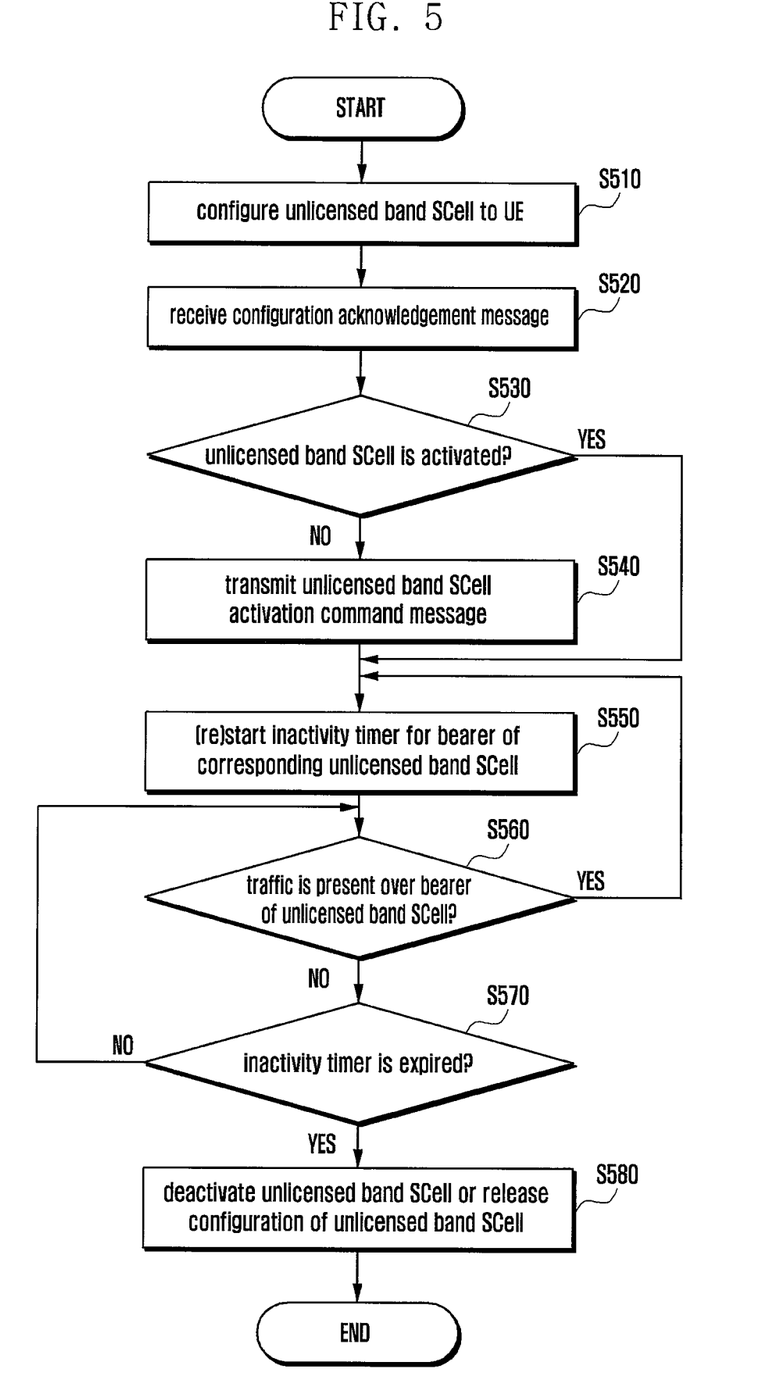
FIG. 5 illustrates an unlicensed-band SCell activation/deactivation.

FIG. 5 illustrates an unlicensed-band SCell activation/deactivation procedure at an eNB according to an embodiment of the present disclosure.

An eNB may configure an SCell operating in an unlicensed frequency band (or unlicensed-band SCell) to a UE connected through a licensed frequency band channel at step S510. The eNB may transmit the UE a message for configuring a cell operating in the unlicensed frequency band to add the unlicensed-band SCell to the UE. In the following description, the term "unlicensed frequency band cell or secondary component carrier" is interchangeably used with the term "unlicensed-band SCell".

The unlicensed band cell may be an LAA cell operating in the unlicensed band or a WLAN cell operating in the unlicensed band on the basis of the LTE-WLAN integration technology.

If the configuration message is received, the UE may acquire information on the unlicensed band cell to be added from the configuration message. The cell information may include the cell identifier and operation frequency of the corresponding cell. The cell information may further include an identifier of the bearer(s) allowing transmission on the corresponding cell.

The eNB may transmit to the UE the configuration message using an RRC message, e.g., RRCConnectionReconfiguration message.

After transmitting the configuration message, the eNB may receive at step S520 an acknowledgement message in response to the configuration message. The acknowledgement message is transmitted for acknowledging successful receipt of the unlicensed-band SCell configuration information included in the configuration message.

If the acknowledgement message is received, the eNB determines at step S530 whether the configured unlicensed-band SCell is activated. The UE may activate the unlicensed-band SCell immediately upon configuration or maintain the configured unlicensed-band SCell in the inactivated state after configuration.

If it is determined that the unlicensed-band SCell is not activated, the eNB activates the unlicensed-band SCell, at step S540. The eNB may transmit the UE an activation command message to activate the unlicensed-band SCell at step S540. The activation command message may be an Activation/Deactivation MAC Control Element (A/D MAC CE) message or an RRC message.

If the unlicensed-band SCell is activated, the eNB starts an inactivity timer, at step S550. In detail, the eNB may start the inactivity timer for use in determining whether packet transmission is present on at least one bearer at the time when the unlicensed-band SCell is activated.

After starting the timer, the eNB may determine at step S560 whether there is traffic present on the bearer allowing transmission on the currently activated unlicensed-band SCell.

If traffic is present on the corresponding bearer, the eNB returns the procedure to step S550 to restart the timer. In detail, the eNB may restart the timer when there is a plurality of bearers allowing transmission on the unlicensed SCell and traffic is present on one of the bearers. Also, the eNB may restart the timer when the total traffic amount present on the bearer is equal to or greater than a predetermined threshold.

If it is determined at step S560 that there is no traffic present on the bearer, the eNB determines, at step S570, whether the timer has expired.

If it is determined that the timer has not expired, the eNB returns the procedure to step S560 to determine whether traffic is present on the bearer.

If the timer has expired and no traffic is present on the bearer, the eNB may release or deactivate the unlicensed-band SCell, at step S580. If there is no traffic until the expiry of the timer, the eNB may determine that there is no need of adding the unlicensed-band SCell and transmit the UE a deactivation command message or unlicensed band SCell configuration release message to deactivate the corresponding unlicensed-band SCell.

The deactivation command message may be an A/D MAC CE message or a newly defined RRC message. The configuration release message may be an RRC message such as an RRCConnectionReconfiguration message.

Figure 6:
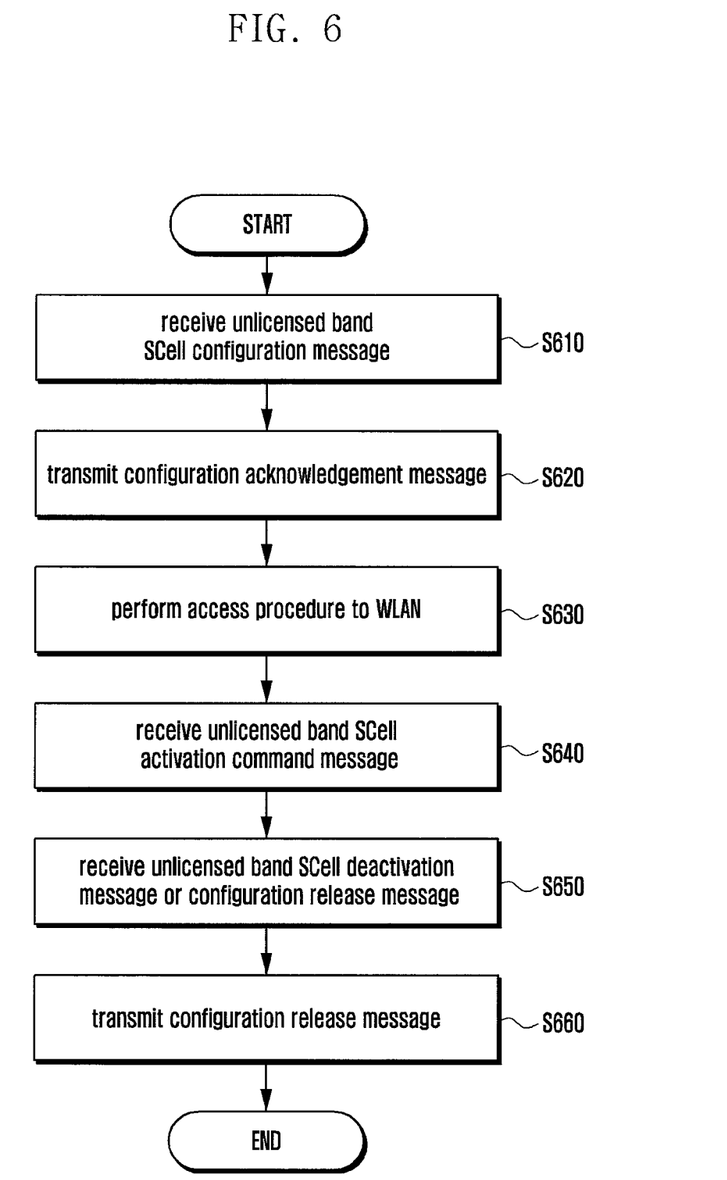
FIG. 6 illustrates an unlicensed-band SCell activation/deactivation procedure at a UE according to an embodiment of the present disclosure.

FIG. 6 illustrates an unlicensed-band SCell activation/deactivation procedure at a UE according to an embodiment of the present disclosure.

With reference to FIG. 6, a UE connected to an eNB supporting unlicensed band communication may receive, at step S610, a message for configuring an unlicensed band cell (hereinafter, referred to interchangeably as unlicensed-band SCell) from the eNB. The unlicensed band cell may be an LAA cell or a WLAN cell as described above.

If the configuration message is received, the UE may acquire the information on the unlicensed band cell that the eNB wants to configure to the UE. The unlicensed band cell information may include a cell identifier and operation frequency of the corresponding cell. The unlicensed band cell information may also include bearer identifier(s) indicating the bearer(s) allowing transmission on the corresponding cell.

The configuration message may be an RRC message, e.g., RRCConnectionReconfiguration message.

The UE may transmit, at step S620, an acknowledgement message for acknowledging successful receipt of the configuration information in response to the configuration message.

The acknowledgement message may be an RRC message, e.g., RRCConnectionReconfigurationComplete message.

If the unlicensed-band SCell is a WLAN cell, the UE may perform, at step S630, a procedure for access to the WLAN indicated in the configuration message. The WLAN access procedure is specified in the IEEE 802.11 standard.

If the unlicensed-band SCell is not a WLAN cell, step S630 may be omitted.

If the unlicensed-band SCell is in the inactivated state, the UE may receive an activation command message for activating the unlicensed-band from the eNB, at step S640. If the unlicensed-band SCell is in the activated state, the activation command message reception step may be omitted.

Afterward, an inactivity time starts and, if no traffic is present on the bearer allowing transmission on the activated unlicensed-band SCell until the expiry of the inactivity timer, the UE may receive, at step S650, a deactivation message for deactivating the unlicensed-band SCell or a configuration release message for releasing the configuration of the unlicensed-band SCell.

The UE may transmit, at step S660, the eNB a configuration release acknowledgement message in response to the deactivation message or configuration release message at step S660.

Figure 7:
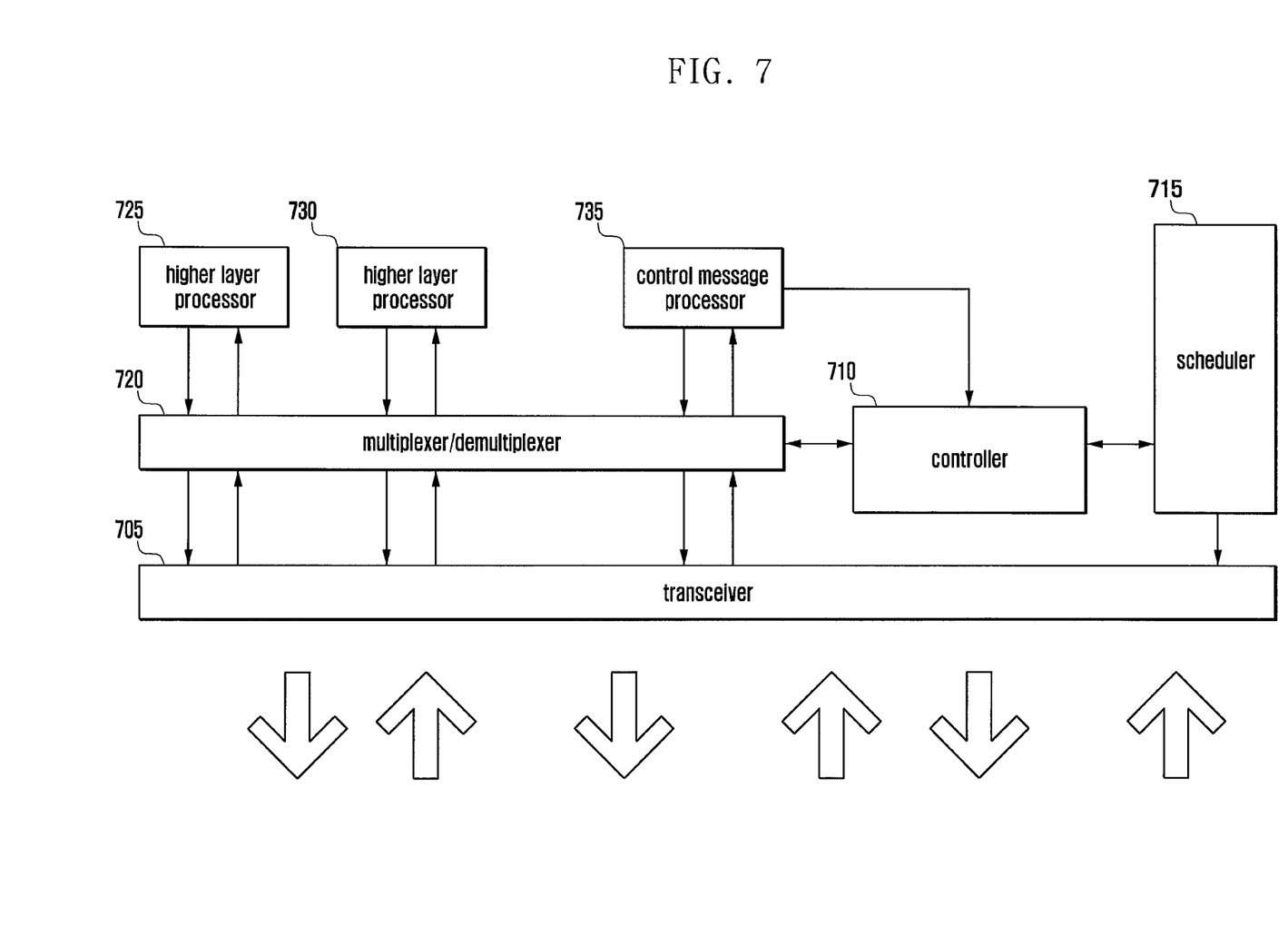
FIG. 7 illustrates a configuration of an eNB according to an embodiment of the present disclosure.

FIG. 7 illustrates a configuration of an eNB according to an embodiment of the present disclosure.

As shown in FIG. 7, the eNB may include a transceiver 705, a controller 710, a multiplexer/demultiplexer 720, a control message processor 735, higher layer processors 725 and 730, and a scheduler 715.

The transceiver 705 transmits data and control signals on a downlink carrier and receives data and control signals on an uplink carrier. In the case that multiple carriers are configured, the transceiver 705 transmits/receives the data and control signals on the multiple carriers.

The multiplexer/demultiplexer 720 multiplexes the data from the higher layer processors 725 and 730 and/or the control message processor 735 and demultiplexes the data received via the transceiver 705. The demultiplexed data is delivered to at least one of the higher layer processing units 725 and 730, the control message processor 735, and/or the controller 710.

The controller 710 may configure an unlicensed band cell (or secondary component carrier) to a UE. In detail, the controller 710 may control to transmit a message for configuring the unlicensed band cell to the UE and receive an acknowledgement message in response to the configuration message.

The controller 710 may determine whether the unlicensed band cell (or secondary component carrier) is activated and, if not, may activate the unlicensed band cell (or secondary component carrier). The controller 710 may control to transmit an unlicensed band cell activation message to the UE. If the unlicensed band cell (or secondary component carrier) is activated, the controller 710 may start an inactivity timer and determine whether packets are present on the bearer allowing transmission on the cell (or secondary component carrier).

If no packet is present on the bearer allowing transmission on the cell (or secondary component carrier), the controller 710 may control to transmit the UE a message for deactivating the unlicensed band cell (or secondary component carrier).

The control message processor 735 may process the control message transmitted by the UE to take a necessary action or generate a control message to be transmitted to the UE to the lower layer. The higher layer processor 725 (730) may be established per UE per service to process data of a user service such as FTP and VoIP and transfer the processed data to the multiplexer/demultiplexer 720 or to process the data from the multiplexer/demultiplexer 720 and deliver the processed data to a service application on the higher layer.

The scheduler 715 allocates transmission resources to the UE at an appropriate timing in consideration of the buffer state, channel condition, and active time of the UE and controls the transceiver to process the signals transmitted by the UE and to transmit signals to the UE.

In the present disclosure, the eNB determines whether to configure an unlicensed band cell to the UE and transmits a configuration message to the UE by means of the control message processor 735. Afterward, the eNB activates the corresponding unlicensed band cell and determines whether traffic is present on the bearer allowing transmission on the corresponding cell. If no traffic is present on the corresponding bearer or if the traffic amount present on the bearer is less than a predetermined threshold, the eNB generates a configuration release message or deactivation message by means of the control message processor 735 and transmits the message to reduce the power consumption of the UE. In the resent disclosure, the transceiver 705, the multiplexer/demultiplexer 720, the control message processor 735, the higher layer processors 725 and 730, and the scheduler 715 operate under the control of the controller 710.

Figure 8:
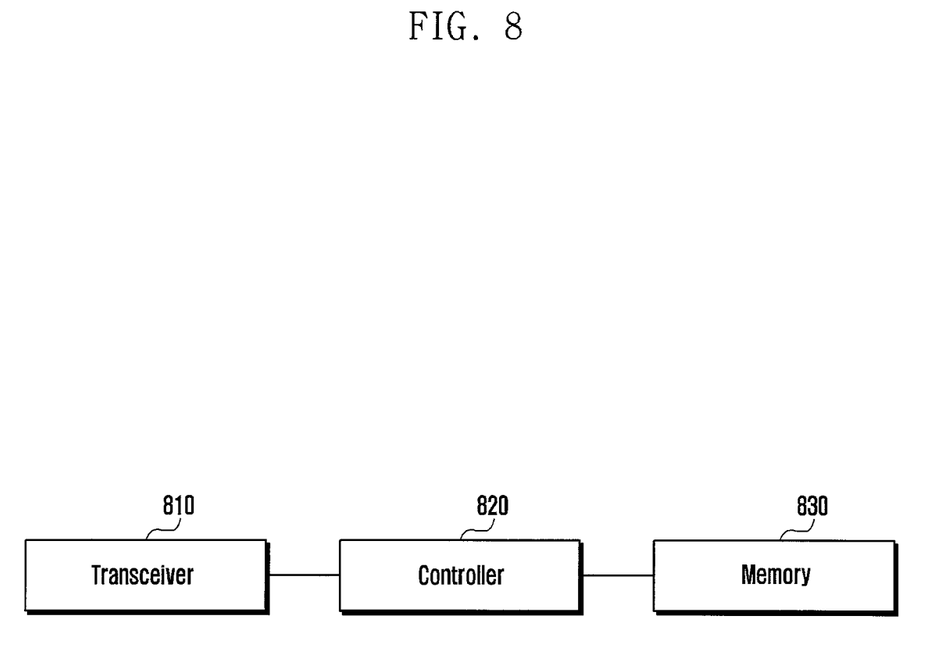
FIG. 8 illustrates a configuration of a UE according to an embodiment of the present disclosure.

FIG. 8 illustrates a configuration of a UE according to an embodiment of the present disclosure.

As shown in FIG. 8, the UE may include a transceiver 810, a controller 820, and a memory 830.

A transceiver 810 may transmit and receive signals to and from other network entities.

The controller 820 may control the UE to receive a message for configuring an unlicensed band cell (or secondary component carrier) to the UE and to receive an acknowledgement message in response to the configuration message. The controller 820 may control to acquire the information on the unlicensed band cell for configuring the UE from the configuration message.

In the case that the unlicensed band cell is a WLAN cell, the controller 820 may control the UE to perform a procedure of access to the WLAN configured based on the configuration message.

In the case that the unlicensed band cell is in the inactivated state, the controller 820 may control the UE to receive a message for activating the corresponding cell from the eNB.

If no packet is present on the bearer allowing transmission on the unlicensed band cell (or secondary component carrier) before expiry of a inactivity timer, the controller 820 may control to receive an unlicensed band cell (or secondary component carrier) deactivation message from the eNB and to transmit an acknowledgement message in response to the deactivation message.

The methods shown in the claims and disclosed in the embodiments of the present disclosure can be implemented in hardware, software, or a combination of both.

As described above, the present disclosure is advantageous in terms of reducing unnecessary power consumption of a UE by deactivating or releasing an unlicensed band cell for the UE when there is no need of use of the unlicensed band in a wireless communication system based on the LAA or LTE-WLAN integration technology.

In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods described in the claims and specifications of the present disclosure.

Such a program (software module or software program) may be stored in a non-volatile memory such as random access memory (RAM) and flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other type of optical storage device, and a magnetic cassette. It may also be possible to store the program in a memory device implemented in combination of part or whole of the aforementioned media. The memory may include a plurality of memories.

The program may be stored in an attachable storage device accessible through a communication network implemented as a combination of Internet, intranet, Local Area Network (LAN), Wireless LAN (WLAN), and Storage Area Network (SAN). The storage device may be attached to the device performing the methods according to embodiments of the present disclosure by means of an external port. It may also be possible for a separate storage device installed on a communication network to attach to the device performing the methods according to embodiments of the present disclosure.

In the embodiments of the present disclosures, the components are described in singular or plural forms depending on the embodiment. However, the singular and plural forms are selected appropriately for the proposed situation just for explanatory convenience without any intention of limiting the present disclosure thereto; thus, the singular form includes the plural forms as well, unless the context clearly indicates otherwise.

Although the present disclosure has been described with embodiments, various changes and modifications may be suggested to one skilled in the art. It is intended that the present disclosure encompass such changes and modifications as fall within the scope of the appended claims.

What is claimed is:

1. A method by a base station, the method comprising:
    transmitting a first message for configuring a secondary cell (SCell) of an unlicensed frequency band to a terminal connected to the base station in a licensed frequency band;
    identifying whether a packet is present on a bearer for the SCell, of which a quality of service (QOS) requirement is less that a predetermined value, for a predetermined time; and
    transmitting, in case that no packet is present on the bearer for the SCell for the predetermined time, a second message for deactivating the SCell corresponding to the bearer,
    wherein an access procedure of the terminal to a wireless local area network is initiated based on the first message in case that the SCell of the unlicensed frequency band is a cell of the wireless local area network, and
    wherein the SCell is deactivated based on the second message.

2. The method of claim 1, wherein the second message for deactivating the SCell is transmitted in case that no packet is present on the bearer until an inactivity timer associated with the SCell expires.

3. The method of claim 2, further comprising restarting, in case that a packet is present on the bearer before the inactivity timer expires, the inactivity timer.

4. A method by a terminal, the method comprising:
    receiving a first message for configuring a secondary cell (SCell) of an unlicensed frequency band from a base station to which the terminal is connected in a licensed frequency band;
    initiating, in case that the SCell of the unlicensed frequency band is a cell of a wireless local area network, an access procedure to the wireless local area network based on the first message; and
    receiving, from the base station, a second message generated in case that no packet is present on a bearer for the SCell, pf which a quality of service (QOS) requirement is less that a predetermined value, for a predetermined time, the second message being for deactivating the SCell corresponding to the bearer,
    wherein the SCell is deactivated based on the second message.

5. The method of claim 4, wherein the second message for deactivating the SCell is generated in case that no packet is present on the bearer until an inactivity timer associated with the SCell expires.

6. The method of claim 5, wherein the inactivity timer is restarted in case that a packet is present on the bearer before the inactivity timer expires.

7. A base station comprising:
    a transceiver; and
    a controller coupled with the transceiver and configured to:
    transmit, via the transceiver, a first message for configuring a secondary cell (SCell) of an unlicensed frequency band to a terminal connected to the base station in a licensed frequency band,
    Identify whether a packet is present on a bearer for the SCell, of whick a quality of service (QOS) requirement is less that a predetermined value, for a predetermined time, and
    transmit, via the transceiver, in case that no packet is present on the bearer for the SCell for the predetermined time, a second message for deactivating the SCell corresponding to the bearer,
    wherein an access procedure of the terminal to a wireless local area network is initiated based on the first message in case that the SCell of the unlicensed frequency band is a cell of the wireless local area network, and
    wherein the SCell is deactivated based on the second message.

8. The base station of claim 7, wherein the controller is configured to transmit, via the transceiver, the second message for deactivating the SCell in case that no packet is present on the bearer until an inactivity timer associated with the SCell expires.

9. The base station of claim 8, wherein the controller is configured to restart, in case that a packet is present on the bearer before the inactivity timer expires, the inactivity timer.

10. A terminal comprising:
    a transceiver; and a controller coupled with the transceiver and configured to:

receive, via the transceiver, a first message for configuring a secondary cell (SCell) of an unlicensed frequency band from a base station to which the terminal is connected in a licensed frequency band, Initiate, in case that the SCell of the unlicensed frequency band is a cell of a wireless local area network, an access procedure to the wireless local area network based on the first message, and receive, via the transceiver, from the base station, a second message generated in case that no packet is present on a bearer for the SCell, of which a quality of service (QOS) requirement is less that a predetermined value, for a predetermined time, the second message being for deactivating the SCell corresponding to the bearer, wherein the SCell is deactivated based on the second message.

11. The terminal of claim 10, wherein the second message for deactivating the SCell is generated in case that no packet is present on the bearer until an inactivity timer associated with the SCell expires.

12. The terminal of claim 11, wherein the inactivity timer is restarted in case that a packet is present on the bearer before the inactivity timer expires.

* * * * *